April 16, 1963  H. B. SMITH ETAL  3,086,201
PULSE DOPPLER RANGE TRACKING SYSTEM
Filed June 28, 1956  7 Sheets-Sheet 2
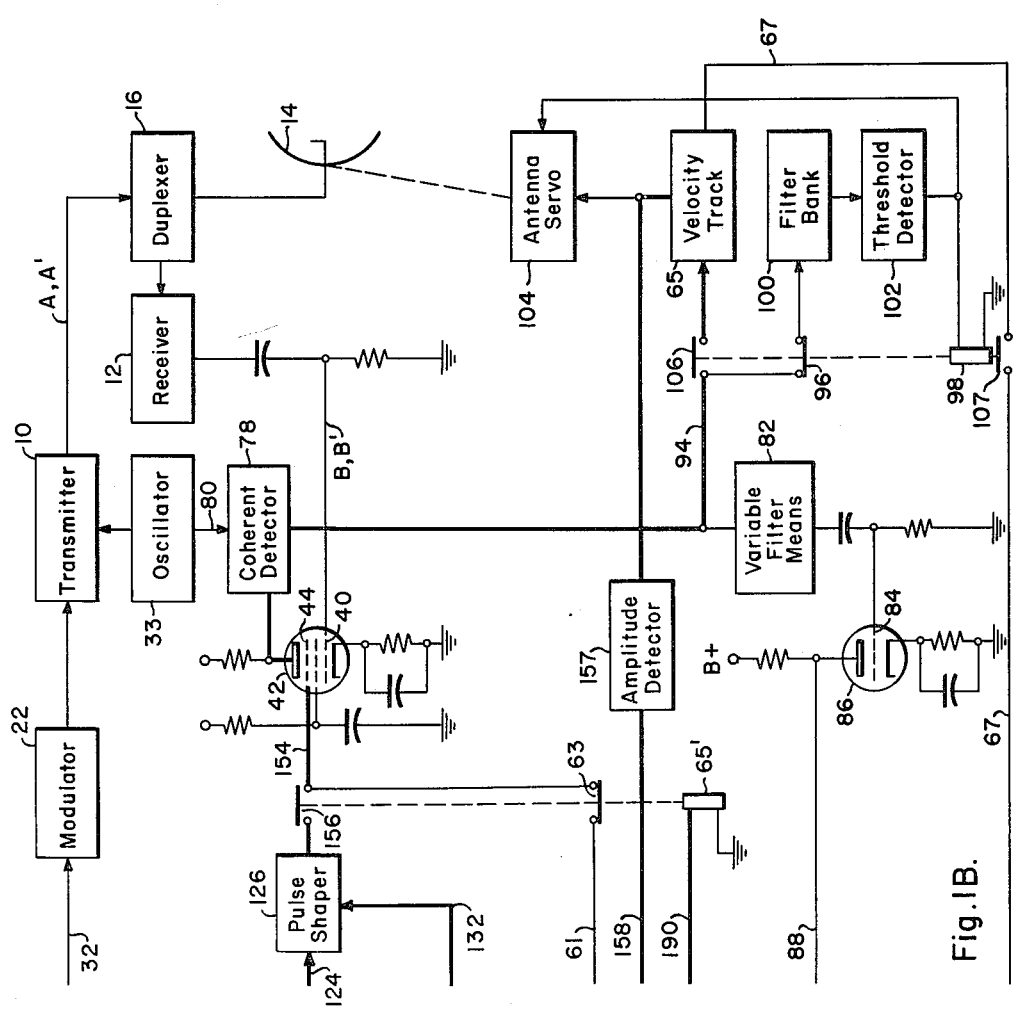

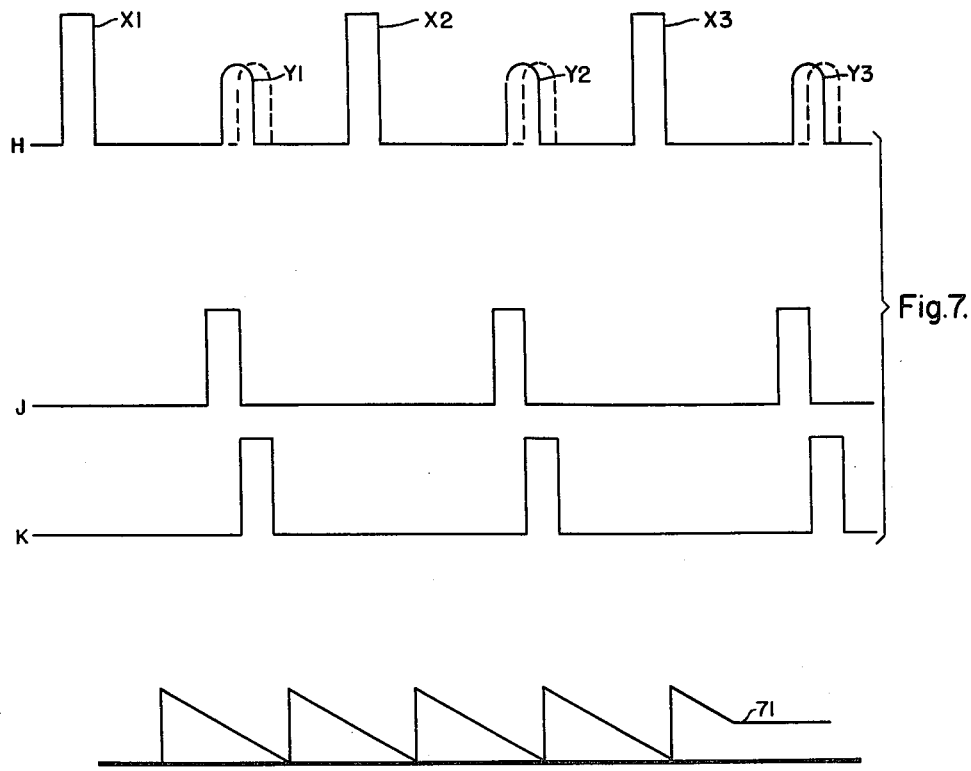

United States Patent Office 3,086,201
Patented Apr. 16, 1963

3,086,201
PULSE DOPPLER RANGE TRACKING SYSTEM
Harry B. Smith, Catonsville, and Walter Ewanus, Glen Burnie, Md., assignors to Westinghouse Electric Corporation, East Pittsburgh, Pa., a corporation of Pennsylvania
Filed June 28, 1956, Ser. No. 594,661
15 Claims. (Cl. 343—8)

This invention relates to pulse Doppler radar systems and more particularly to the automatic range tracking portion of a pulse Doppler radar system which employs multiple values of the transmitted pulse repetition frequency and in which the values of the transmitted pulse repetition frequencies are extremely high to accommodate the Doppler shift of high velocity targets.

In a copending application, Serial No. 570,444, filed March 9, 1956, now U.S. Patent No. 3,023,409, issued February 27, 1962, and assigned to the assignee of the present application, there is described a pulse Doppler radar system in which two values of the transmitted pulse repetition frequency are employed having a common submultiple. Initially, when the radar antenna of this system is searching for a target, the first pulse repetition frequency is used. When a target is detected in the search process, the antenna stops. At the same time, a tracking gate is produced which, in effect, is a series of voltage pulses which have the same pulse repetition frequency and phase position as the target returns at this first pulse repetition frequency. The relative position of this gate is stored in a memory circuit as a direct current voltage. Then, the frequency of the transmitted pulses is shifted to the second pulse repetition frequency, and a second tracking gate is produced, and its position is stored in a memory circuit. If the two sets of tracking gates are passed through a coincidence stage, they will coincide periodically and produce an output pulse. These output pulses are then compared in phase with a series of pulses having a fundamental pulse repetition frequency equal to the difference between the first and second pulse repetition frequencies to produce a direct current output voltage which is proportional to range.

It is a primary object of this invention to provide an automatic range tracking circuit for a radar system of the type described above. As will become apparent from the following detailed description, time modulation is performed in the range track loop of the present invention at the fundamental period or difference frequency between the two values of pulse repetition frequency to permit continuous range tracking through many range periods. To accomplish this, a linear saw-tooth circuit operating at the fundamental frequency is used in a time modulator to generate pulses at the fundamental frequency, controllable in time over one cycle of the fundamental frequency by a tracking error voltage. In order to use these pulses as range gates, they are fed to two or more frequency multipliers, one for each value of the pulse repetition frequency. The frequency of the output of these multipliers is identical to the transmitted pulse repetition frequencies, respectively, and is controllable in time or phase over many cycles. After suitable pulse shaping, these multiplier outputs are used as tracking range gates. As mentioned previously, the direct current voltage proportional to true range is injected into the loop to initially set the time modulator to correspond to the true range. During tracking, continuous true range information is thereby available.

In one embodiment of the invention hereinafter described, range tracking is accomplished through the use of a controlled and periodic jitter of the range gates. When the target moves from coincidence with the range gates, this jitter causes the generation of an appropriate error voltage in the form of modulations of the system output to provide a means of correction. Essentially, the system is a type of phase detection where errors result in an output signal whose amplitude is proportional to the error and whose polarity depends upon the sense of the error. A double integrator is used to give the loop memory during target fading or alternatively, a velocity aiding voltage is supplied from a velocity tracking loop.

In another embodiment of the invention hereinafter described, range tracking is accomplished by means of early and late gates. That is, the range gate output of the aforesaid frequency multipliers is divided into two parts, one of which is direct and the other of which is delayed one pulse width by a delay line. The delayed and direct gates are then separately compared with true target returns. If the range of the target should change, the target returns will change in phase, and the output of the two comparison stages will become different, thereby creating an unbalance. If these two outputs are fed to a difference detector or similar device it will produce an output voltage proportional to the unbalance. This output is then fed to the time modulator of the range track loop to again position the range gates over the target.

The above and other objects and features of the invention will become apparent in the following detailed description taken in connection with the accompanying drawings which form a part of this specification and in which:

FIGURES 1a and 1b, when placed end-to-end, schematically illustrate one embodiment of the invention employing a reference oscillator and controlled time jitter of the range gates to facilitate range tracking;

FIGS. 2a and 2b, when placed side-by-side, schematically illustrate another embodiment of the invention employing the early and late gate method to facilitate range tracking;

FIG. 3, when placed side-by-side with FIG. 2a, schematically illustrates still another embodiment of the invention which also employs the early and late gate method to facilitate range tracking;

FIG. 5 is a waveform illustrating the output of the various range search and storage circuits shown in FIGS. 1 and 2;

Figure 2A:
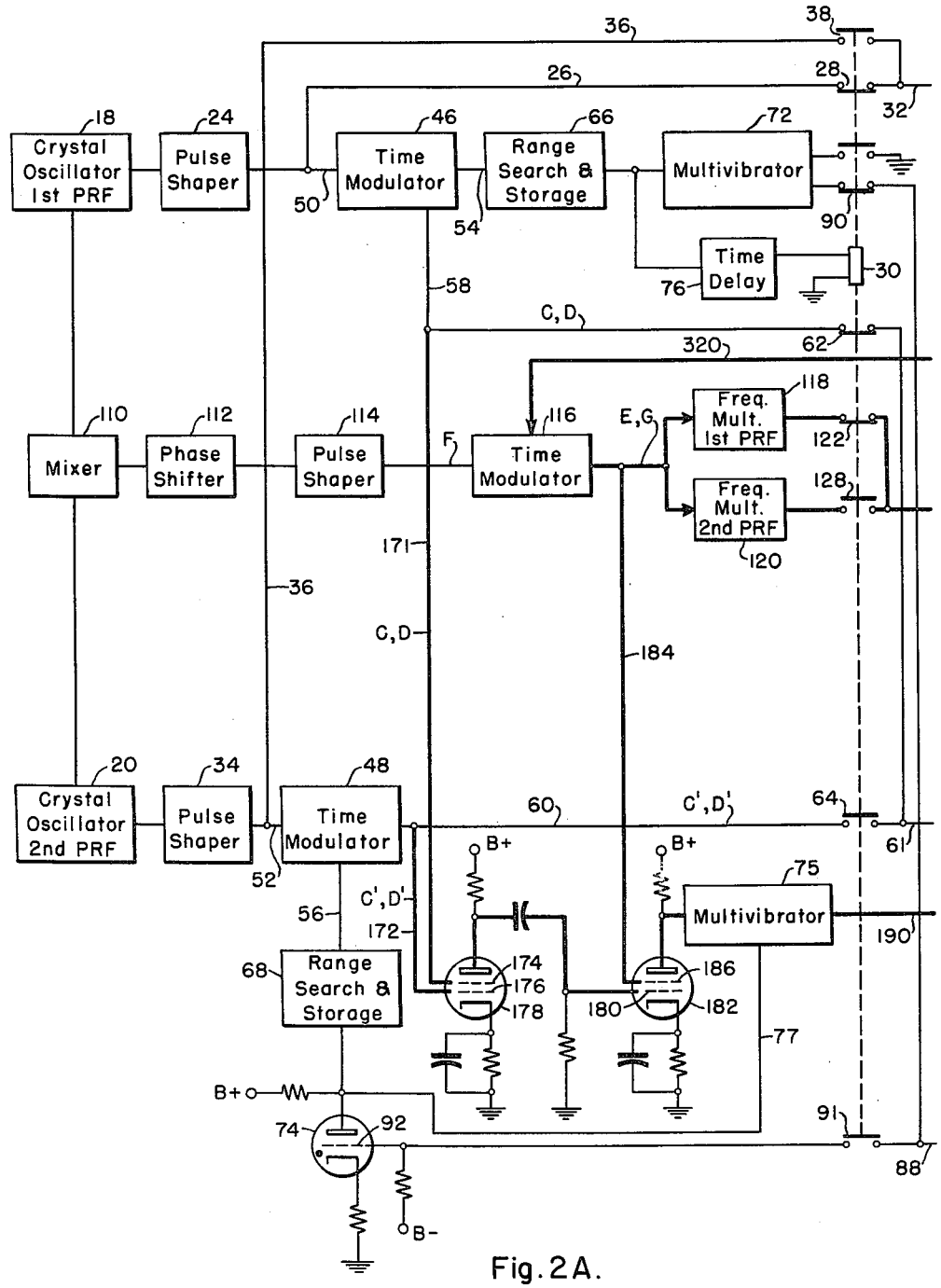
Figure 2B:
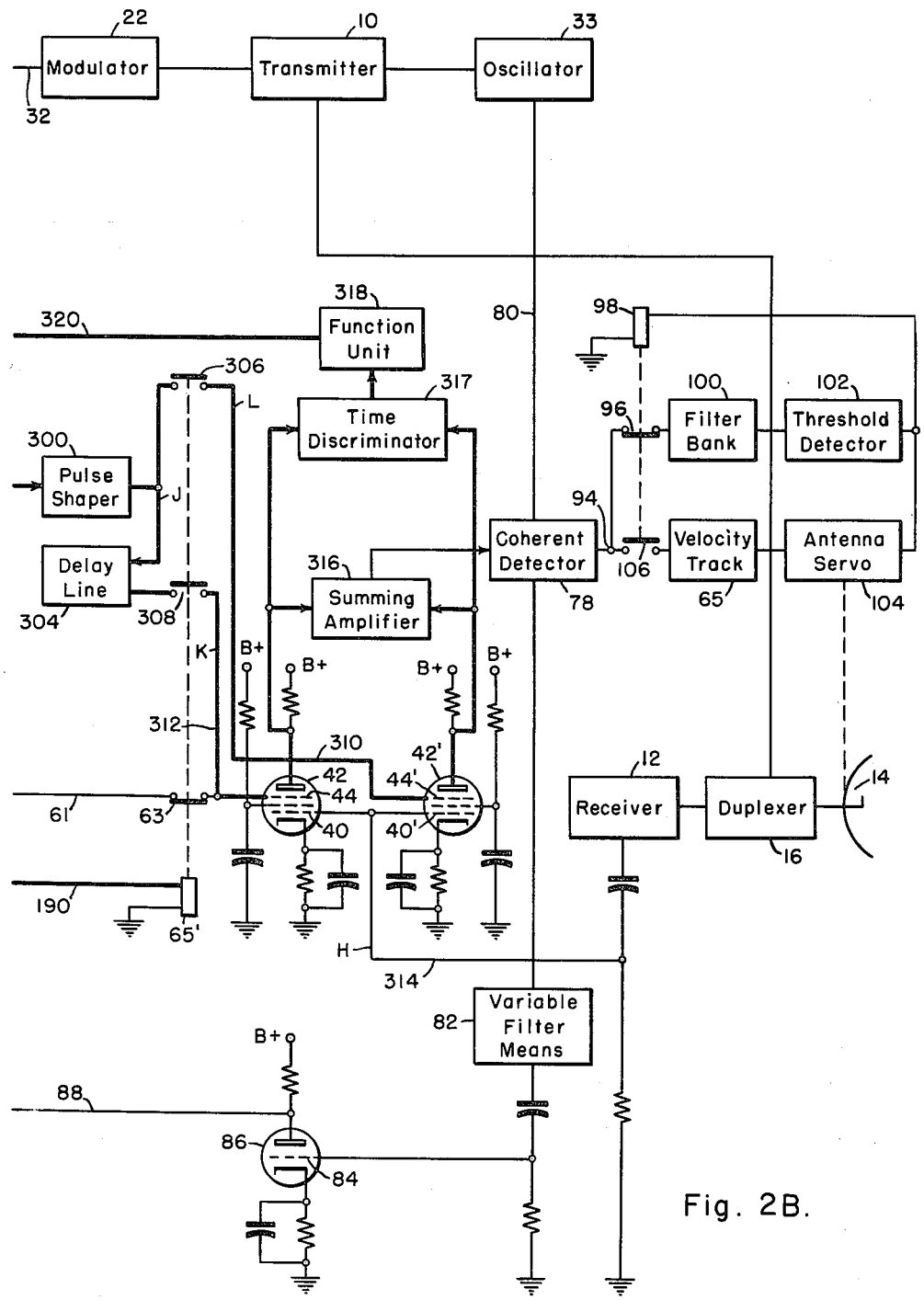
Figure 3:
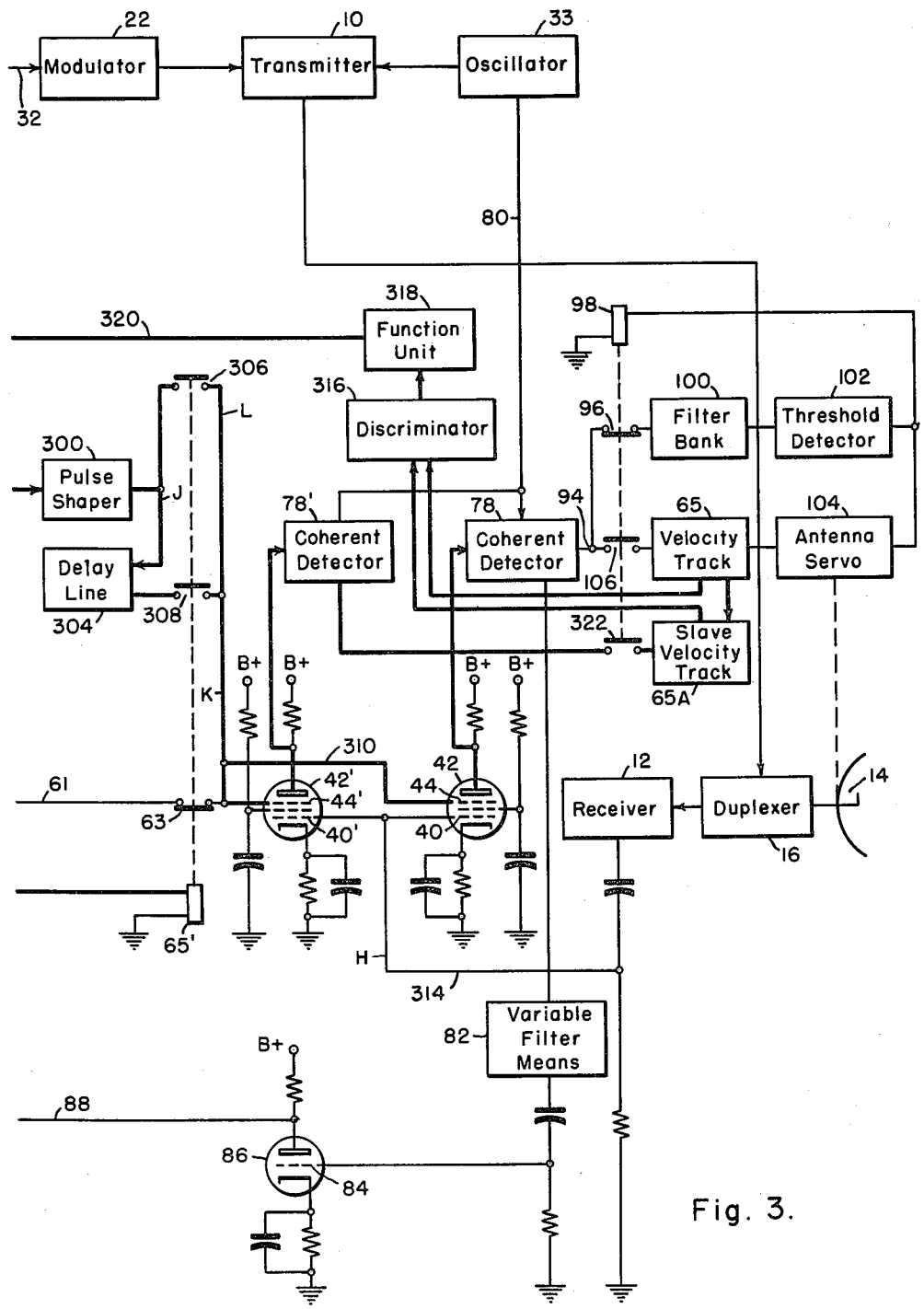

FIGS. 6a to 6d constitute a graphical illustration of the reference oscillator and jitter method of range tracking employed by the circuit of FIG. 1; and FIG. 7 constitutes a graphical illustration of the early and late gate method of range tracking employed by the circuits of FIGS. 2 and 3.

Referring to FIG. 1, the system shown comprises a transmitter 10 and a receiver 12 coupled to a directional antenna 14 by a fast response and fast recovery duplexer 16. Two crystal oscillators 18 and 20, or equivalent frequency sources having different output frequencies, are provided. These outputs are adapted to trigger a pulser or modulator 22 to generate pulses to turn on a radio frequency amplifier comprising transmitter 10 which is driven by CW oscillator 33 to furnish R.F. power to antenna 14. A sine wave from oscillator 18 is formed into pulses in pulse shaper 24. From shaper 24, pulses pass through line 26, normally closed contacts 28 of relay 30 and line 32 to modulator 22. Likewise, the sine wave from oscillator 20 is adapted to pass through pulse shaper 34, line 36, the normally open contacts 38 of relay 30 and line 32 to modulator 22. The pulsed energy from modulator 22 then permits the radio frequency carrier energy from oscillator 33 to be amplified in transmitter 10. Received energy pulses, after amplification in receiver 12, are applied to the control grid 40 of a pentode 42. The receiver shown is simply an amplifier, but a superheterodyne arrangement would be more common in which oscillator 33 is introduced in the first heterodyning process after translation by the I.F. frequency.

Under normal conditions, the bias on the suppressor grid 44 of pentode 32 is below cutoff. The A.C. voltage of the pulse envelopes applied to control grid 40 cannot initiate conduction in the tube unless a pulse is supplied to suppressor grid 44. Alternatively, the range gating described above can be accomplished after the signal has been detected in a coherent detector 78, provided the latter has sufficient bandwidth.

The voltage pulses applied to suppressor grid 44 are supplied from one of two time modulators 46 or 48. As is well known to those skilled in the art, a time modulator comprises a circuit adapted to produce a train of uniformly spaced output pulses having a pulse repetition frequency equal to the original repetition frequency and having a variable delay, the input pulses in this case being at the radar system pulse repetition frequency. As shown, pulses of the first repetition frequency are fed to time modulator 46 via line 50, and those of the other repetition frequency are fed to time modulator 48 via line 52. The output pulses from the time modulators are positioned in phase with respect to the transmitted energy pulses in the radar system as a function of a direct current control voltage. This control voltage is fed to time modulator 46 via line 54 and to time modulator 48 via line 56. The output pulses from time modulators 46 and 48 appear on lines 58 and 60, respectively. Although a functional description only of the time modulators is given above, it should suffice for purposes of the present specification. A full and detailed description of the various types of time modulators may be found in Waveforms, volume 19, M.I.T. Radiation Laboratories Series, by D. Sayre, McGraw-Hill Book Company, Inc., New York, 1949.

Under normal operating conditions, the output pulses of time modulator 46 are applied to suppressor grid 44 of pentode 42 through the normally closed contacts 62 of relay 30, line 61, and the normally closed contacts 63 of relay 65'. Output pulses from time modulator 48 are adapted to be applied to suppressor grid 44 through line 60, the normally open contacts 64 of relay 30, line 61 and the normally closed contacts 63 of relay 65'.

The direct current control voltages for time modulators 46 and 48 are supplied from range sweep and storage circuits 66 and 68, respectively. The output of these circuits is a repetitive, linearly decreasing voltage somewhat like a saw-tooth waveform as shown in FIG. 5. One type of range search and storage circuit which may be used in the present invention is shown and described in copending application Serial No. 524,016, filed July 25, 1955, now U.S. Patent No. 2,879,503, issued March 24, 1959, and assigned to the assignee of the present application. For purposes of the present invention however, it should be sufficient to state that the output voltage from the range search and storage circuits 66 and 68 will appear as the waveform shown in FIG. 5 until circuit 66 receives a stop search signal on line 67, or circuit 68 receives a stop search signal on line 69. At the instant when the range search and storage circuits receive a stop search signal (indicated by point 71 in FIG. 5), they will stop their linear rundown in voltage and maintain their output voltage substantially constant as shown except that a slight correction may be imparted to the stored voltage to account for changes in target range due to target motion. The correction is made by a voltage proportional to velocity as obtained from a velocity track 65 via line 67. The stop search signal for range search and storage circuit 66 is supplied from a multivibrator 72, whereas the stop search signal for circuit 68 is supplied by a thyratron 74 which also supplies an enabling gate to multivibrator 75 via line 77. As shown, multivibrator 72 is also adapted to control relay 30 via line 76.

The radar transmitter 10 sends out pulses of radio frequency energy at a particular frequency. In accordance with well known Doppler theory, if these pulses of radio frequency energy should strike a stationary object, they will be reflected back to antenna 14 with the same frequency at which they were transmitted, assuming the radar set is stationary. If the radar set is mounted on a moving aircraft, the pulses of radio frequency energy which strike stationary objects will be received with a shift in frequency proportional to the speed of the aircraft. If the transmitted pulses strike a moving object, however, they will experience a Doppler shift in frequency which is not proportional to the speed of the aircraft. It is desirable to separate the target returns of moving targets from those of stationary targets and to pass the moving target returns only to the range tracking portion of the system. To this end, coherent detector 78, variable filter means 82 and velocity track 65 are provided. Essentially, the coherent detector is a mixer which produces an output difference frequency. The target returns are mixed with the output of radio frequency oscillator 33 which is fed to the coherent detector 78 through line 80. Target returns from stationary targets will have substantially the same frequency as the transmitted signal; however, target returns from moving targets, having experienced a Doppler shift in frequency, will pass from the coherent detector 78 and through variable filter circuit 82. The filtering circuit employed is essentially a bandpass filter with suitable heterodyning, one possible embodiment of which is shown in copending application Serial No. 542,820, filed October 26, 1955, now U.S. Patent No. 2,871,468, issued January 27, 1959 and assigned to the assignee of the present application.

The output of variable filter means 82 will be an audio signal of a particular intermediate frequency indicating the existence of a moving target. This signal is applied to the grid 84 of a triode 86 which is normally biased to form a threshold to prevent the passage of random noise signals. The output of the triode for a signal from variable filter circuit 82 of sufficient amplitude is, in turn, applied through line 88 and the normally closed contacts 90 of relay 30 to multivibrator 72. The signal from triode 86 is also adapted to be applied through the normally open contacts 91 of relay 30 to grid 92 in thyratron 74 which is normally held cut off by a negative voltage supplied to the grid 92.

The output of coherent detector 78 is also applied through line 94 and the normally closed contacts 96 of relay 98 to a bank of filters 100. Signals passing through one or more of the filters in the filter bank 100 overcome the bias on the threshold detector arrangement 102 to produce an output signal. This signal has two functions:

(1) It commands the antenna servo 104 to cease a general scanning motion and stop preparatory to eventually assuming a tracking function wherein the antenna 14 follows a particular target; and
(2) It actuates relay 98 to open contacts 96, close contacts 106, and close contacts 107.

When contacts 106 close, the output of coherent detector 78 is applied to the velocity tracking circuit 65 which functions eventually to cause the antenna servo motor 104 and antenna 14 to automatically track or follow a moving target by supplying an appropriate error signal produced by lobing or conically scanning the feedhorn of antenna 14 by means, not shown. Tracking circuits of this type are well known in the art. The velocity track loop will maintain track of the velocity and supply a voltage proportional to velocity for correction of the receiver gates in range search and storage circuits 66 and 68. Contacts 107 of relay 98 switch in this correction voltage after detection.

Referring again to crystal oscillators 18 and 20, the outputs of these two circuits are applied to a mixer circuit 110 which produces a sine wave output signal having a frequency equal to the difference of the frequencies of oscillators 18 and 20. This difference signal is applied through a phase shifter 112 included for adjustment purposes to a pulse shaper 114 which produces output trigger pulses at the difference or fundamental frequency. The output pulses of pulse shaper 114 are applied as synchronizing pulses to a time modulator 116 which functions in substantially the same manner as time modulators 46 and 48 but with a considerably greater range of time variation.

The range tracking portion of the system, shown in heavy lines to distinguish it from the rest of the system, will now be described. It will be seen from the following description that range tracking is accomplished through the use of a reference oscillator causing controlled jitter of the range gates which results in these gates moving back and forth slightly in a prescribed and periodic manner over a small time increment in the vicinity of the received echo. When the range gate is displaced off center with respect to the target, this time jitter causes a modulation of the signal output in an amount which provides an appropriate error voltage for correction purposes. Essentially, the system is the familiar type of phase detection where errors result in an output signal whose amplitude is proportional to the error and whose polarity depends upon the sense of the error. A velocity correction derived from the velocity track 65 is used to give the loop memory during fading or, alternately, a double integrator can be used in the loop as in conventional pulse radar range tracking arrangements.

The output pulses of time modulator 116 are passed through two frequency multipliers 118 and 120. Frequency multiplier 118 increases the frequency of the output pulses by responding only to a high order harmonic of the pulse at the low fundamental frequency from time modulator 116 by virtue of a band-pass filter of high selectivity in multiplier 118; whereas frequency multiplier 120 increases the fundamental frequency of the output of the time modulator to the second pulse repetition frequency generated by crystal oscillator 20. The resulting output pulses from frequency multiplier 118 are applied through normally closed contacts 122 of relay 30 and line 124 to a pulse shaper 126. Likewise, the resulting output pulses from frequency multiplier 120 are adapted to be applied through normally open contacts 128 of relay 30 and line 124 to pulse shaper 126. The duration of the pulses from pulse shaper 126 are of the same order of time as that of the pulse from transmitter 10. The output of reference oscillator 130 is applied via line 132 to pulse shaper 126 by some convenient means to jitter the time position of the pulses in a controlled and periodic manner. That is, it causes the pulses from frequency multiplier 118 or 120, as the case may be, to oscillate back and forth over a small time region which would surround a target echo. A full and detailed description of the pulse shaper 126 may be had by reference to copending application Serial No. 592,233, filed June 13, 1956, and assigned to the assignee of the present application.

The output pulses from pulse shaper 126 are adapted to be applied through line 154 and normally open contacts 156 of relay 65' to grid 44 of pentode 42. If it is assumed that relays 65' and 98 are energized, and contacts 156 and 106 are closed, then the output pulses from pulse shaper 126 on grid 44 of pentode 42 will be adapted to coincide with target returns from receiver 12 on grid 40 to produce an output from the pentode which passes through coherent detector 78, line 94, contacts 106, velocity track circuit 65, amplitude detector 157 and line 158 to an error signal filter 160. From error filter 160 the signal passes through an error amplifier 162 to a phase detector 164 which compares the signal from amplifier 162 with that from reference oscillator 130. An output signal results whose amplitude is proportional to the difference in phase between the two signals fed into the detector and whose polarity depends upon whether or not the signal from amplifier 162 is leading or lagging that from reference oscillator 130. The output signal from phase detector 164, being a slowly varying direct current signal, passes through an integrator 166 and function unit 168 to the time modulator 116.

Function unit 168 merely serves to connect to the time modulator 116: (1) the signal from integrator 166 (which may be a double integrator in the absence of velocity correction), (2) the signal from range search and storage circuit 170, and (3) a voltage proportional to velocity from velocity track 65 via line 67 and contacts 107 of relay 98. The signal from phase detector 164 during track, or range search and storage circuit 170 during range measurement, as the case may be, serves to position the output pulses from time modulator 116 in phase in much the same way that the signals from circuits 66 and 68 serve to position the output pulses of time modulators 46 and 48, respectively, except that time modulation here is performed at a lower or difference frequency.

Figure 1A:
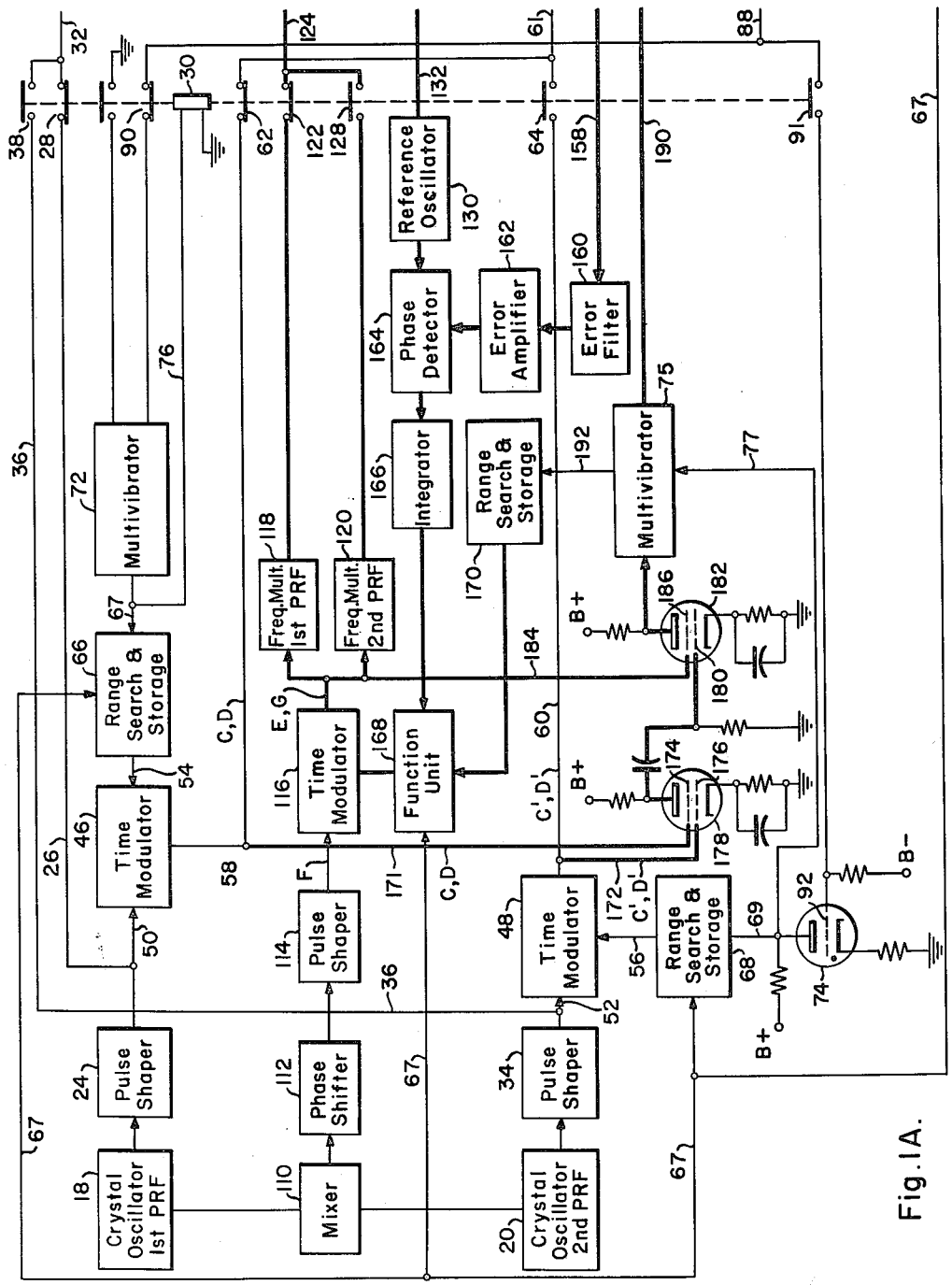

In FIG. 1a, it can be seen that the output pulses of time modulators 46 and 48 are applied via lines 171 and 172, respectively, to grids 174 and 176 in a first coincidence detector 178. When the pulses on line 171 from time modulator 46 coincide with those from time modulator 48 on line 172, coincidence detector 178 will produce an output pulse which is applied to the grid 180 of a second coincidence detector 182. The output pulses of time modulator 116 are applied via line 184 to the other grid 186 of the second coincidence detector 182. Thus, when an output pulse from coincidence detector 178, signifying coincidence of a pulse from time modulator 46 with a pulse from time modulator 48, coincides with an output pulse from time modulator 116, the coincidence detector 182 will conduct to trigger a multivibrator 75 which has already been enabled by the triggering of the thyratron 74. When the multivibrator is triggered, it energizes relay 65' via line 190, and also applies a signal via line 192 to range search and storage circuit 170 to cause the output of this circuit to stop its linear rundown and hold its voltage at a point similar to that of point 71 shown in FIG. 5.

Figure 4:
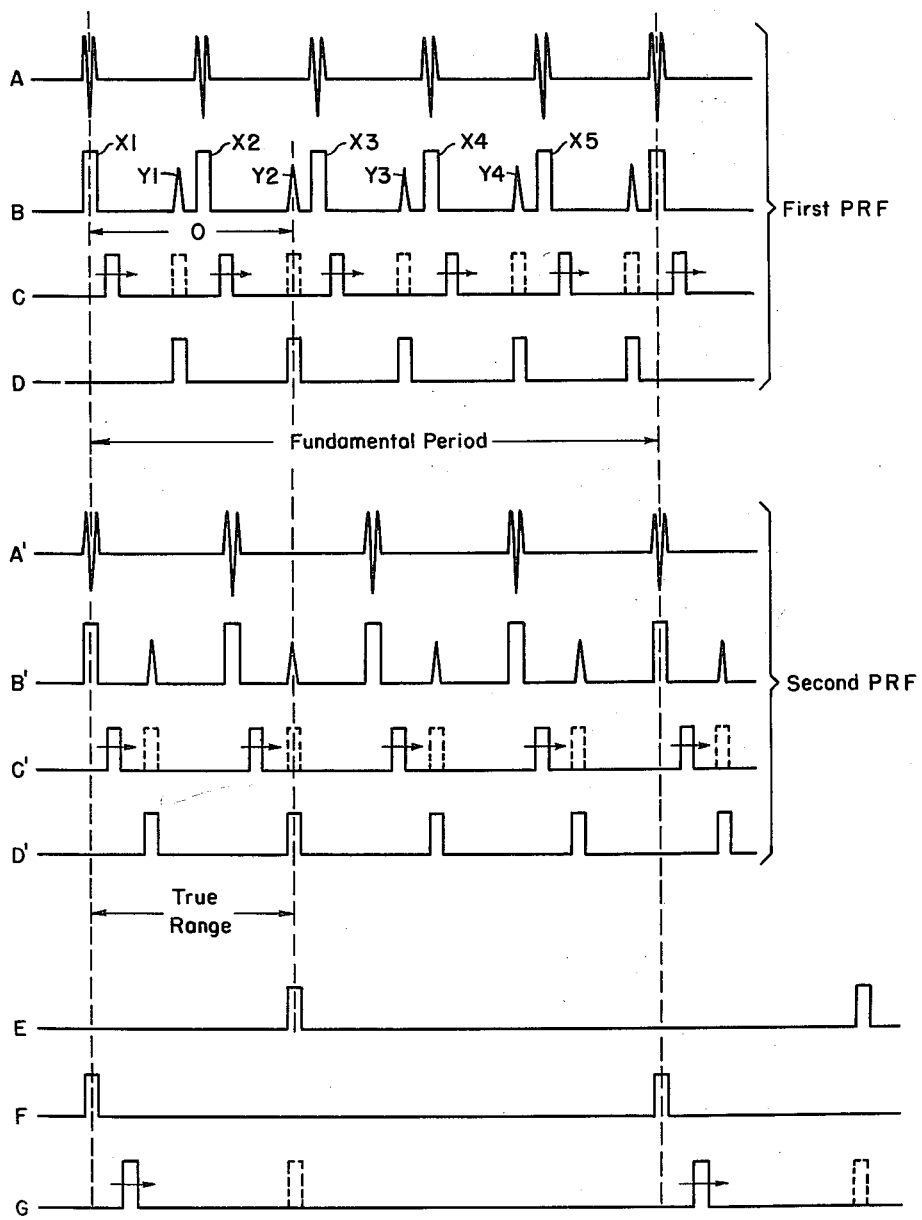
FIG. 4 is an illustration of waveforms appearing at various points in the circuits of FIGS. 1, 2 and 3.

Operation of the invention may best be understood by reference to FIGS. 4 and 6 which illustrate waveforms appearing at various points in the circuit of FIGS. 1a and 1b. The waveforms of FIG. 4 are identified by letters and the points at which these waveforms appear in FIGS. 1a and 1b are indicated by like reference letters.

Under normal conditions, when the radar system is searching for a moving target, the crystal oscillator 18 is connected to modulator 22 through pulse shaper 24, line 26, normally closed contacts 28, and line 32. Antenna 14 will be moved through a scanning pattern by antenna servo 104 and the contacts of all the relays will be in the positions shown. The signal of the first pulse repetition frequency transmitted from the transmitter 10 appears as waveform A in FIG. 4. It consists of a series of spaced pulses of radio frequency energy at the first pulse repetition frequency, in this case approximately 120 kilocycles. When the radar beam intercepts a target, the envelope of the A.C. signal from receiver 12 will appear as waveform B. As each pulse is transmitted, a certain amount of radio frequency energy will be deflected through the receiving portion of the antenna 14 and will be detected by the receiver in the system. Hence, a series of pulses X1, X2, X3, etc. (called "main bangs") will appear in the wave shape. Reflected energy pulses from a target are indicated by pulses Y1, Y2, Y3, etc. The pulse repetition rate of the transmitted pulses is such that two or more pulses will be transmitted from the system before a reflected echo from the target can return to the antenna. This is done to facilitate high speed targets, and in this manner the present system differs from a conventional radar system wherein the echo from one transmitted pulse is received by the system before the next subsequent pulse is transmitted. Thus, it is not apparent from an examination of the waveform B whether received pulse Y1, Y2 or Y3 is a reflected pulse of transmitted pulse X1. The pulses Y1, Y2 and Y3 will always be substantially equidistant (neglecting movement of the target) since their corresponding transmitted pulses are equidistant. For purposes of the present explanation, it will be assumed that Y2 is a reflected pulse of X1. Consequently, the distance φ indicates true range.

Before a target is detected by the system, multivibrator 72 will apply a potential to range search and storage circuit 66 to permit it to produce a saw-tooth output waveform similar to that shown in FIG. 5. Thyratron 74, being normally non-conducting by virtue of a cut-off potential applied to its grid 92, will cause range search and storage 68 to range search but without the property of storage due to open contact 91, thereby rendering it inoperative. Multivibrator 75 will be disabled by the same nonconducting state of thyratron 74. The output pulses of time modulator 46, having a pulse repetition frequency equal to that of the transmitted pulses by virtue of the time modulator connection to crystal oscillator 18, will be periodically swept over a range equal to the distance between successive transmitted pulses. The sweeping output of time modulator 46, moving from left to right, will appear as waveform C in FIG. 4. These pulses are applied by normally closed contacts 62 of relay 30, line 61, and normally closed contacts 63 of relay 65' to grid 44 of pentode 42.

When a true target is detected by the system and the target returns shown in waveform B coincide with the moving pulses in waveform C in pentode 42, the pentode will conduct to produce an output signal which passes through coherent detector 78 and variable filter means 82 to the grid 84 of triode 86. The output of the triode is, in turn, applied through line 88 and normally closed contacts 90 of relay 30 to multivibrator 72. The multivibrator 72 is, therefore, switched from one stable state to the other; and it applies a stop search potential to range search and storage circuit 66. This causes the range search and storage circuit to maintain its output voltage constant as shown by point 71 in FIG. 5 with a velocity correction introduced by the voltage applied through line 67. As a result, the output voltage pulses from time modulator 46 are maintained at a constant phase position, plus a small velocity correction, to remain in coincidence with the return target signals as shown by waveform D in FIG. 4.

The output from multivibrator 72 also actuates the relay 30 to reverse the position of its contacts. Consequently, crystal oscillator 18 is now disconnected from modulator 22 since contacts 28 are now open; and crystal oscillator 20 is connected to modulator 22 through pulse shaper 34, line 36, contacts 38 and line 32. A signal of a second pulse repetition frequency, shown as waveform A' in FIG. 4 is now transmitted from the system. For illustrative purposes, five pulses at the second pulse repetition frequency are shown transmitted over a time interval during which six pulses at the first pulse repetition frequency were transmitted. Return echoes at the second pulse repetition frequency are now applied to the control grid 40 of pentode 42. However, time modulator 48 is now connected to suppressor grid 44 via line 60, contacts 64, line 61, and contacts 63. Furthermore, range search and storage circuit 68 is rendered operative by virtue of the fact that grid 92 of thyratron 74 is connected to a source of negative bias potential and no signal is present through contacts 91 and line 88. Range search and storage circuit 68 will, therefore, apply a repetitive saw-tooth waveform to time modulator 48 which will, in turn, supply a series of output pulses (waveform C') at the second pulse repetition frequency which are periodically swept over a range equal to the distance between successive transmitted pulses at the second pulse repetition frequency. These pulses are applied via line 60, contacts 64, line 61, and contacts 63 to grid 44 in pentode 42. When the pulses from modulator 48 on grid 44 coincide with the target returns on grid 40 at the second pulse repetition frequency, the pulses which pass through coherent detector 78, variable filter means 82, triode 86, and contacts 91 to grid 92 in thyratron 74 turn on the thyratron, thereby stopping the linear rundown in voltage of range search and storage circuit 68 and enable the multivibrator 75. The range search and storage circuit will then hold its output voltage constant with a velocity correction, and the output of the time modulator 48 will appear as waveform D' in FIG. 4 where the pulses coincide with the target returns of waveform B'.

The waveforms D and D' are applied via lines 171 and 172 to grids 174 and 176 in coincidence detector 178. When these pulses coincide, they will produce output pulses substantially similar to those shown by waveform E in FIG. 4.

The difference frequency output of pulse shaper 114 will appear as waveform F in FIG. 4. These pulses are applied to time modulator 116. The output of range search and storage circuit 170 which is normally applied to the time modulator 116 causes the output pulses from the time modulator, at the fundamental frequency, to move from left to right over a time interval equal to the distance between successive pulses from pulse shaper 114 as shown by waveform G in FIG. 4. When the output pulses from time modulator 116 reach the position shown by the dotted lines on waveform G, they will coincide with the output pulses (waveform E) from coincidence detector 178. Since these pulses are applied to grids 186 and 180 in coincidence detector 182, the detector will conduct when the pulses in waveforms E and G coincide to trigger multivibrator 75 to change from one stable state to the other. The multivibrator thus applies a stop search signal to range search and storage circuit 170 thence through function unit 168 to cause time modulator 116 to hold the phase position of its output pulses constant with velocity correction at the position shown by the dotted lines in waveform G. In addition, multivibrator 75 will now energize relay 65' through line 190, thereby opening contacts 63 and closing contacts 156.

Before this time, a target was detected and relay 98 was energized, contacts 106 of relay 98 were closed, and a closed tracking loop was completed through pulse shaper 126, contacts 156, pentode 42, coherent detector 78, contacts 106, velocity track circuit 65, amplitude detector 157, line 158, filter 160, amplifier 162, phase detector 164, integrator 166, function unit 168, time modulator 116, frequency multiplier 120, contacts 128 of relay 30, and line 124.

After the output pulses from time modulator 116 (waveform G) are positioned over the true target returns, they will remain in that position unless a direct current error voltage from phase detector 164 is fed into the time modulator 116. In order to sense a change in range of the target, the output pulses from frequency multiplier 120 are time jittered in a regular manner in pulse shaper 126. This process is shown graphically in FIG. 6. The output pulses from frequency multiplier 120 will be identically the same as those of waveform D' shown in FIG. 4 wherein each pulse of waveform D' coincides with a target return in waveform B'. In order to provide an automatic range tracking system, it is necessary to provide means for sensing a change in the phase position of the target returns in waveform B' with respect to the pulses in D' from frequency multiplier 120.

In FIG. 6 it can be seen that each of the output pulses 200 of frequency multiplier 120 is jittered or periodically shifted in phase over a time interval equal to a fraction of the pulse width. Since the output pulses from pulse shaper 126 and the target returns from receiver 12 are compared in pentode 42, the output energy from pentode 42 will depend upon the degree of coincidence between the pulses from pulse shaper 126 on grid 44 and the target returns on grid 40. In FIGS. 6b–6d the target returns are all indicated generally by 202. Obviously, the energy output of pentode 42 will be greatest when there is exact coincidence between the pulse 200 from pulse shaper 126 and the target return 202. As pulse 200 is moved to the right, the energy output of pentode 42 will drop until the pulses 200 and 202 no longer coincide at which time the energy output of the pentode 42 will be zero. As pulse 200 moves to the left, the energy level will then increase from zero to a maximum at exact coincidence and then back to zero when the pulse 200 has moved to the left to a sufficient degree so that the two pulses no longer coincide. In operation, reference oscillator 130 will cause the pulses 200 to first move to the right in an amount equal to a fraction of the pulse width, as shown by the dotted line in FIG. 6b and will then cause the pulse 200 to move back through dead center to the left in an amount equal to a fraction of the pulse width as shown by FIG. 6c. In FIG. 6a it can be seen by the solid line curve 204 that at the beginning of the cycle when the pulses 200 and 202 coincide exactly, the energy output of pentode 42 will be at a maximum. When the pulse 200 moves to the position shown by the dotted lines in FIG. 6b the energy level will fall to one-half of its original value since the pulses now coincide by only one-half. Then pulse 200 will move back through dead center, at which time the energy level again reaches a maximum. When the pulse 200 moves to the left as shown in FIG. 6c by one-half pulse width, the energy level again falls to one-half and then increases to a maximum when the pulse 200 moves back to dead center to complete the cycle. It can thus be seen that as the pulse 200 moves through one cycle, when the target return 202 and the output of frequency multiplier 120 are exactly coincident, the output energy level of pentode 42 will pass through two cycles. The frequency of the output signal of pentode 42 is passed through the range tracking circuit to phase detector 164 which is adjusted with respect to reference oscillator 130 to produce zero output error voltage when this condition exists (i.e., when the output of pentode 42 passes through two cycles as reference oscillator 130 and pulse shaper 126 pass through one cycle).

Now it will be assumed that the return target pulse 202 and pulse 200 are no longer coincident but that pulse 202 has moved to the right by one-half the pulse width as shown in FIG. 6d. The resulting energy versus time curve is shown by the dotted line 206 in FIG. 6a. Now, when pulse 200 first moves to the right, the energy level of the output of pentode 42 will increase from one-half its maximum value to a maximum. Then, as pulse 200 moves to the left the energy level will fall until the pulse 200 reaches its extreme left position, at which time the pulses 200 and 202 will no longer be coincident and the energy level will fall to zero. At the completion of the cycle, the energy level will again rise to one-half its maximum value. As will be understood, if the pulse 202 moves to the left rather than to the right, a wave form such as that shown by dotted line 208 in FIG. 6a will be produced.

It should be apparent from the foregoing that as the target moves in range and the target returns change their phase position relative to the output pulses of frequency multiplier 120, the phase of the error frequency from pentode 42 fed to the phase detector 164 will be materially changed. The amount to which the phase changes will, of course, depend upon the change in range of the target. The phase detector 164 will produce an output current whose magnitude is proportional to the phase deviation and whose polarity depends upon the relative phase sense of the signal coming from pentode 42. This output current is applied through integrator 166 and function unit 168 to time modulator 116 to again position the output pulses 200 from frequency multiplier 120 over the target returns 202. In this manner the output pulses from frequency multiplier 120 will effectively "follow" the target returns and the output voltage from integrator 166 fed to time modulator 116 will be proportional to the true range of the target. This tracking is assisted by a velocity correction in the form of a voltage supplied from the velocity track 65 administered via line 67 and the function unit 168.

In FIGS. 2a and 2b, the radar system is substantially the same as that shown in 1a and 1b except for the range tracking loop. Accordingly, elements in FIGS. 2a and 2b, corresponding to elements in FIGS. 1a and 1b, are indicated by like reference numerals. The only difference in the systems is that in FIGURES 2a and 2b velocity correction of the range gates is not used; whereas it is used in FIGS. 1a and 1b. Since the main radar system of FIGS. 2a and 2b is substantially the same as that shown in FIGS. 1a and 1b, only the range tracking loop of FIGS. 2a and 2b will be described.

Referring to FIG. 2a, the output pulses of time modulator 116 are again passed through frequency multipliers 118 and 120, respectively, in the manner previously described which serve, respectively, to increase the pulse repetition frequency of the output pulses of time modulator 116 to the first and second pulse repetition frequencies. The output pulses from multiplier 118 or 120, as the case may be, are fed to a pulse shaper 300. The output of the pulse shaper is then divided into two parts, one direct and the other delayed, by delay line 304. Delay line 304 functions to delay the pulses from circuit 300 by one pulse width. Assuming that relay 65' is energized and contacts 306 and 308 are closed, the early gate from pulse shaper 300 (direct gate) will be applied via line 310 to the grid 44' of one of two identical pentodes 42'. Output pulses from delay line 304 passing through contacts 308 and line 312 are applied to the grid 44 of the other identical pentode 42. Return signals from receiver 12 are fed via line 314 to the grids 40 and 40' of each of the pentodes 42 and 42'.

The outputs of the pentodes 42 and 42' are fed to a summing amplifier 316, the output of which is fed to the coherent detector 78 which functions in the same manner as the coherent detector shown in FIG. 1b. The output pulses from the pentodes are also fed to a time discriminator 317 which is adapted to produce an output voltage proportional to the difference between the output waveforms from pentodes 42 and 42', respectively. The output voltage from the time discriminator is fed through function unit 318 and line 320 to the time modulator 116 to supply an error voltage to correct for any gate positional errors.

As was the case in FIG. 1, coincidence of a pulse from time modulator 46 with a pulse from time modulator 48 in coincidence detector 178 will produce an output pulse which, when it coincides with an output pulse from time modulator 116 in coincidence detector 182, will trigger multivibrator 75 to energize relay 65'.

Operation of the circuit may best be understood by reference to FIG. 7 where the video return signal is indicated as waveform H. As in FIG. 4, pulses X1, X2 and X3 are "main bangs," whereas pulses Y1, Y2 and Y3 are the target returns. Assuming that the first pulse repetition frequency is being used, the pulses shown in wave form J in FIG. 7 will be those from frequency multiplier 118 which are fed via contacts 122 of relay 30 to pulse shaper 300. In delay line 304, the pulses are delayed by one pulse width. Accordingly, the output pulses appearing on line 312 will appear as waveform K. The direct pulses (or early gates) will appear as waveform J on line 310.

As long as the early and late gates J and K, respectively, have the relative phase positions with respect to the target returns shown in FIG. 7, pentodes 42 and 42' will conduct in equal amounts and the output of the time discriminator 317 will be zero. However, if the video return signals Y1, Y2, Y3, etc. should shift to the right as shown by the dotted outline in FIG. 7, they will coincide to a greater degree with the late gate K than with the early gate J. Consequently, the output pulses from pentode 42' will now have a wider pulse width than those from pentode 42. Consequently, the time discriminator 317 will deliver a current through function unit 318 (which serves to integrate this error signal) and line 320 to time modulator 116 which shifts the phase of the early and late gates so that they are again in balanced coincidence with the video return signals. In this manner the voltage appearing on line 320 will be proportional to the true range of the target being tracked.

The system just described has no velocity selection after initial tracking conditions are programmed into the system. That is, the signals from pentodes 42 and 42' are not passed through filtering apparatus. Therefore, they lose the added property of a Doppler system to discriminate against targets in velocity. Consequently, signals from targets of undesired velocities, from receiver 12, may cause the range tracking loop to lose the true target.

A range tracking system, similar to that shown in FIGS. 2a and 2b, but which takes advantage of velocity selection, is shown in FIG. 3 in combination with FIG. 2a. In this case the output pulses from frequency multiplier 118 or 120 are again applied to the pulse shaper 300 and delay line 304 to produce early and late gates. However, the outputs of pentodes 42 and 42' are passed through two coherent detectors 78 and 78'. The output of coherent detector 78 is fed through contacts 106 of relay 98 to velocity tracking circuit 65, whereas the output of coherent detector 78' is fed to a slave velocity tracking circuit 65A through contacts 322. Discriminator 316 is then fed by the outputs of the velocity tracking circuits 65 and 65A. Now, the output signals from pentodes 42 and 42' must pass through identical coherent detectors 78 and 78' and selective filters in the velocity tracking stages 65 and 65A which filter out undesirable signals and pass only target returns which have experienced a desired Doppler shift in frequency. Only one of the velocity tracking circuits 65 is needed to control antenna servo 104, as shown.

Although the invention has been shown in connection with certain specific embodiments, it should be readily apparent to those skilled in the art that various changes in form and arrangement of parts can be made to suit requirements without departing from the spirit and scope of the invention.

We claim as our invention:

1. In a pulse Doppler radar system, a source of energy pulses having a first pulse repetition frequency, a source of energy pulses having a second pulse repetition frequency means for selectively transmitting energy pulses at said first or second repetition frequency, apparatus connected to said sources of energy pulses for producing a source of energy pulses having a fundamental pulse repetition frequency equal to the difference between said first and second repetition frequencies, a time modulator coupled to said apparatus and responsive to a control current for producing spaced output pulses having a pulse repetition frequency equal to the said fundamental frequency and a phase position relative to output pulses from said apparatus which is a function of said control current, a frequency multiplier for increasing the repetition frequency of pulses from said time modulator to said first repetition frequency, a second frequency multiplier for increasing the repetition frequency of pulses from said time modulator to said second repetition frequency, a source of oscillatory voltage, modulator means adapted to be coupled to the output of one of said frequency multipliers for jittering the phase of the output pulses from said frequency multiplier as a function of said oscillatory voltage, means for comparing the phase of energy pulses reflected from a distant object with the jittered output of said modulating means to produce an alternating current signal, a phase detector, means for feeding said oscillatory voltage and said alternating current signal to said phase detector to produce a varying direct current signal whose amplitude is proportional to the phase difference between the signals and whose polarity depends upon the relative phases of the signals, means for feeding said varying direct current signal to said time modulator as a control current, and means for causing said transmitting means to transmit one of the two sources of energy pulses while simultaneously coupling the corresponding frequency multiplier to said jittering means.

2. In a pulse Doppler radar system, a source of energy pulses having a first pulse repetition frequency, a source of energy pulses having a second pulse repetition frequency, means for selectively transmitting pulses at said first or second repetition frequency, apparatus connected to said sources of energy pulses for producing a source of pulses having a fundamental pulse repetition frequency equal to the difference between said first and second repetition frequencies, a time modulator coupled to said apparatus and responsive to a control current for producing spaced output pulses having a pulse repetition frequency equal to said fundamental frequency and a phase position relative to output pulses from said apparatus which is a function of said control current, a frequency multiplier for increasing the repetition frequency of pulses from said time modulator to said first frequency, a second frequency multiplier for increasing the repetition frequency of pulses from said time modulator to said second repetition frequency, a source of oscillatory voltage, means adapted to be coupled to the output of one of said frequency multipliers for jittering the phase of the output pulses from said frequency multiplier as a function of said oscillatory voltage, means for comparing the phase of energy pulses reflected from a distant object with the jittered output of said jittering means, a phase detector, means for feeding said oscillatory voltage and the output of said comparing means to said phase detector, means for feeding the output of said phase detector to said time modulator as a control current, and means for causing said transmitting means to transmit one of the two sources of energy pulses while simultaneously coupling the corresponding frequency multiplier to said jittering means.

3. In a pulse Doppler radar system, a source of energy pulses having a first pulse repetition frequency, a source of energy pulses having a second pulse repetition frequency, means for normally transmitting energy pulses of the first pulse repetition frequency, means for receiving transmitted energy pulses reflected from a distant object, apparatus connected to said first-mentioned sources of energy pulses for producing a source of pulses having a fundamental pulse repetition frequency equal to the difference between said first and second repetition frequencies, a time modulator coupled to said apparatus and responsive to a control current for producing spaced output pulses having a pulse repetition frequency equal to said fundamental frequency and a phase position relative to output pulses from said apparatus which is a function of said control current, a frequency multiplier for increasing the repetition frequency of pulses from said time modulator to said first frequency, a second frequency multiplier for increasing the repetition frequency of pulses from said time modulator to said second repetition frequency, a source of oscillatory voltage, means normally coupled to the output of the first-mentioned frequency multiplier for jittering the phase of the output pulses from said first-mentioned frequency multiplier as a function of said oscillatory voltage, means for comparing the phase of energy pulses reflected from a distant object with the jittered output of said jittering means, a phase detector, means for feeding said oscillatory voltage in the output of said comparing means to said phase detector, means for feeding the output of said phase detector to said time modulator as a control current, and means responsive to intial phase coincidence of a received energy pulse with the jittered output of said jittering means for causing said transmitting means to transmit said source of energy pulses of the second repetition frequency and for coupling the output of said second frequency multiplier to said jittering means.

4. In a pulse Doppler radar system, a source of energy pulses having a first pulse repetition frequency, a source of pulses having a second pulse repetition frequency, means for normally transmitting pulses of said first repetition frequency, means for receiving transmitted energy pulses reflected from a distant object, apparatus connected to said first-mentioned sources of pulses for producing a source of energy pulses having a fundamental pulse repetition frequency equal to the difference between said first and second repetition frequencies, a time modulator coupled to said apparatus and responsive to a control current for producing spaced output pulses having a pulse repetition frequency equal to said fundamental frequency and a phase position relative to output pulses from said apparatus which is a function of said control current, a first frequency multiplier for increasing the repetition frequency of pulses from said time modulator to said first repetition frequency, a second frequency multiplier for increasing the repetition frequency of pulses from said time modulator to said second repetition frequency, a pair of signal channels, means for normally coupling both of said channels to the output of said first multiplier, means in one of said channels for delaying the phase of signals in said one channel by one pulse width of pulses from said first multiplier, a phase comparator in each of said channels for comparing the phase of the delayed or direct pulses with received energy pulses reflected from a distant object, a time discriminator responsive to the output of said comparators for producing an ouput signal proportional to the difference in pulse width of pulses from said comparators, means for feeding the output signal from said time discriminator to said time modulator as a control current, and means responsive to initial phase coincidence of a received energy pulse and a pulse from one of said channels for causing said transmitting means to transmit signals of said second repetition frequency and for coupling said channels to the output of said second frequency multiplier.

5. An automatic range tracking circuit for a pulse Doppler radar system adapted to transmit energy pulses at any one of a plurality of pulse repetition frequencies comprising, in combination, means including a time modulator for producing a train of pulses having a pulse repetition frequency equal to that of the pulses transmitted from the system and a relative phase position which is a function of a control current fed to said time modulator, a source of oscillatory voltage, modulator means coupled to the output of said last-mentioned means and responsive to said source of oscillatory voltage for jittering the phase of said train of pulses, means for comparing the phase of energy pulses reflected from a distant object with the jittered output of said modulating means to produce an alternating current signal, a phase detector, means for feeding said oscillatory voltage and said alternating current signal to said phase detector to produce a varying direct current signal, and means for feeding said direct current signal to said time modulator as a control current.

6. An automatic range tracking circuit for a pulse Doppler radar system adapted to transmit energy pulses at any one of a plurality of pulse repetition frequencies comprising, in combination, means including a time modulator for producing a train of pulses having a pulse repetition frequency equal to that of pulses transmitted from the system and a relative phase position which is a function of a control voltage fed to said time modulator, a source of oscillatory voltage, modulator means coupled to the output of said last-mentioned means and responsive to said source of oscillatory voltage for jittering the phase of said train of pulses, means for comparing the phase of energy pulses reflected from a distant object with the jittered output of said modulating means to produce an alternating current signal, a phase detector, means for feeding said oscillatory voltage and said alternating current signal to said phase detector to produce a varying direct current signal, means for feeding said direct current signal to said time modulator as a control voltage, and means responsive to initial phase coincidence of a pulse in the jittered train of pulses with an energy pulse reflected from a distant object to cause the system to change the repetition frequency of pulses transmitted therefrom and for changing the repetition frequency of said train of pulses.

7. An automatic range tracking circuit for a pulse Doppler radar system adapted to transmit energy pulses at any one of a plurality of pulse repetition frequencies comprising, in combination, means including a time modulator for producing a train of energy pulses having a pulse repetition frequency equal to that of pulses transmitted from the system and a relative phase position which is a function of a control current fed to said time modulator, means for jittering the phase of said train of pulses, means for comparing the phase of energy pulses reflected from a distant object with the jittered output of said modulating means to produce an alternating current signal, means responsive to said alternating current signal for producing a varying direct current signal, and means for feeding said direct current signal to said time modulator as a control current.

8. An automatic range tracking circuit for a pulse Doppler radar system adapted to transmit energy pulses at any one of a plurality of pulse repetition frequencies comprising, in combination, means including a time modulator for producing a train of energy pulses having a pulse repetition frequency equal to that of pulses transmitted from the system and a relative phase position which is a function of a control voltage fed to said time modulator, means for jittering the phase of said train of pulses, means for comparing the phase of energy pulses reflected from a distant object with the jittered output of said modulating means to produce an alternating current signal, means responsive to said alternating current signal for producing a varying direct current signal, means for feeding said direct current signal to said time modulator as a control current, and means responsive to initial phase coincidence of a pulse in the jittered train of pulses with an energy pulse reflected from a distant object to cause the system to change the repetition frequency of pulses transmitted therefrom and for changing the repetition of said train of pulses.

9. An automatic range tracking circuit for a pulse Doppler radar system adapted to transmit energy pulses at any one of a plurality of pulse repetition frequencies comprising, in combination, means including a time modulator for producing a train of pulses having a pulse repetition frequency equal to that of pulses transmitted from the system and a relative phase position which is a function of a control voltage fed to said time modulator, a pair of signal channels, means, for applying said train of pulses to both of said signal channels, means in one of said channels for delaying the phase of signals in said one channel by one pulse width of the pulses from said first multiplier, a phase comparator in each of said channels for comparing the phase of the delayed or direct pulses with received energy pulses reflected from a distant object, a time discriminator responsive to the output of said comparator for producing a slowly varying direct current signal, and means for feeding said direct current signal to said time modulator as a control current.

10. An automatic range tracking circuit for a pulse Doppler radar system adapted to transmit energy pulses at any one of a plurality of pulse repetition frequencies comprising, in combination, means including a time modulator for producing a train of pulses having a pulse repetition frequency equal to that of pulses transmitted from the system and a relative phase position which is a function of a control voltage fed to said time modulator, a pair of signal channels, means for applying said train of pulses to both of said signal channels, means in one of said channels for delaying the phase of signals passing therethrough, means in each of said channels for comparing the phase of the delayed or direct pulses with received energy pulses reflected from a distant object, means responsive to the outputs of said comparing means for producing a direct current, and means for feeding said direct current to said time modulator as control current.

11. An automatic range tracking circuit for a pulse Doppler radar system adapted to transmit energy pulses at any one of a plurality of pulse repetition frequencies comprising, in combination, means including a time modulator for producing a train of pulses having a pulse repetition frequency equal to that of pulses transmitted from the system and a relative phase position which is a function of a control voltage fed to said time modulator, a pair of signal channels, means for applying said train of pulses to both of said signal channels, means in one of said channels for delaying the phase of signals passing therethrough, means in each of said channels for comparing the phase of the delayed or undelayed pulses with received energy pulses reflected from a distant object, means responsive to the outputs of said comparing means for producing a direct current, means for feeding said direct current to said time modulator as a control current, and means responsive to initial phase coincidence of a pulse in one of said chambers with an energy pulse reflected from a distant object to cause the system to change the repetition frequency of pulses transmitted therefrom and for changing the repetition frequency of said train of pulses.

12. An automatic range tracking circuit for a pulse Doppler radar system adapted to transmit energy pulses at any one of a plurality of pulse repetition frequencies comprising, in combination, means including a time modulator for producing a train of energy pulses having a pulse repetition frequency equal to that of pulses transmitted from the system and a relative phase position which is a function of a control current fed to said time modulator, means responsive to said train of energy pulses and to receive energy pulses reflected from a distant object for producing a direct current which is proportional to the difference in phase between said reflected pulses and said train of pulses, and means for feeding said direct current to said time modulator as a control current.

13. An automatic range tracking circuit for a pulse Doppler radar system adapted to transmit energy pulses at any one of a plurality of pulse repetition frequencies comprising, in combination, means including a time modulator for producing a train of energy pulses having a pulse repetition frequency equal to that of pulses transmitted from the system and a relative phase position which is a function of a control current fed to said time modulator, means responsive to said train of energy pulses and to received energy pulses reflected from a distant object for producing a direct current which is proportional to the difference in phase between said reflected pulses and said train of pulses, means for feeding said direct current to said time modulator as a control voltage, and means responsive to at least partial phase coincidence of a pulse in said train of pulses with an energy pulse reflected from a distant object to cause the system to change the repetition frequency of pulses transmitted therefrom and for changing the repetition frequency of said train of pulses.

14. In a pulse Doppler radar system, a source of energy pulses having a first pulse repetition frequency, a source of energy pulses having a second pulse repetition frequency, means for normally transmitting pulses of said first repetition frequency, switch means for actuating said transmitting means to transmit pulses of said second repetition frequency after a target is detected by pulses transmitted at said first repetition frequency, means for receiving transmitted energy pulses reflected from a distant object, apparatus connected to said first-mentioned sources of energy pulses for producing a source of energy pulses having a fundamental pulse repetition frequency equal to the difference between said first and second repetition frequencies, a time modulator coupled to said apparatus and responsive to a control current for producing spaced output pulses having a pulse repetition frequency equal to said fundamental frequency and a phase position relative to output pulses from said apparatus which is a function of said control current, means connected to the output of said time modulator for producing a train of energy pulses having a pulse repetition frequency equal to that of pulses transmitted from the radar system and a relative phase position which is a function of a control current fed to said time modulator, means responsive to said train of energy pulses and to received energy pulses reflected from a distant object for producing a direct current which is proportional to the difference in phase between said reflected pulses and said train of pulses, and means for feeding said direct current to said time modulator as a control current.

15. In a pulse Doppler radar system, a source of energy pulses having a first pulse repetition frequency, a source of energy pulses having a second pulse repetition frequency, means for normally transmitting energy pulses of the first pulse repetition frequency, means for receiving transmitted energy pulses reflected from a distant object, apparatus connected to said first-mentioned sources of energy pulses for producing a source of pulses having a fundamental pulse repetition frequency equal to the difference between said first and second repetition frequencies, a time modulator coupled to said apparatus and responsive to a control current for producing spaced output pulses having a pulse repetition frequency equal to said fundamental frequency and a phase position relative to output pulses from said apparatus which is a function of said control current, a first frequency multiplier for increasing the repetition frequency of pulses from said first time modulator to said first frequency, a second frequency multiplier for increasing the repetition frequency of pulses from said time modulator to said second repetition frequency, means normally connected to said first frequency multiplier and responsive to received energy pulses reflected from a distant object for producing a direct curent which is proportional to the difference in phase between said reflected pulses and said train of pulses, means for feeding said direct current to said time modulator as a control current, and means responsive to at least partial phase coincidence of a received energy pulse with the output of said first frequency multiplier for actuating said transmitting means to transmit said source of energy pulses of the second repetition frequency and for connecting the output of said second frequency multiplier to said means for producing a direct current.

References Cited in the file of this patent

UNITED STATES PATENTS 2,422,074    Bond  ---------------- June 10, 1947